(12) United States Patent
Fournier

(10) Patent No.: US 7,874,126 B2
(45) Date of Patent: Jan. 25, 2011

(54) SERVICE LINE DISTRIBUTION BASE

(76) Inventor: Paul W. Fournier, 1302 rue Robincrest, Mascouche, Québec (CA) J7L 3S4

( * ) Notice: Subject to any disclaimer, the term of this patent is extended or adjusted under 35 U.S.C. 154(b) by 0 days.

(21) Appl. No.: 12/819,500

(22) Filed: Jun. 21, 2010

(65) Prior Publication Data

US 2010/0252321 A1  Oct. 7, 2010

Related U.S. Application Data

(63) Continuation of application No. 11/431,833, filed on May 11, 2006, now Pat. No. 7,765,770, which is a continuation of application No. PCT/CA2004/001586, filed on Aug. 31, 2004.

(30) Foreign Application Priority Data

Nov. 12, 2003  (CA) .................................... 2449194

(51) Int. Cl.
  *E04C 3/00* (2006.01)
(52) U.S. Cl. .................. 52/843; 174/45 R; 362/431
(58) Field of Classification Search .................. 52/244, 52/296, 301, 726.4, 300, 831, 843, 844, 848, 52/FOR. 119; 248/530; 174/38, 45 R, 493; 362/431
See application file for complete search history.

(56) References Cited

U.S. PATENT DOCUMENTS

| | | | | |
|---|---|---|---|---|
| 3,289,369 A | * | 12/1966 | Marcus | 52/295 |
| 3,343,322 A | * | 9/1967 | Lurkis et al. | 52/298 |
| 4,519,657 A | * | 5/1985 | Jensen | 439/191 |
| 5,581,958 A | * | 12/1996 | Cote | 52/40 |
| 6,254,314 B1 | * | 7/2001 | Park et al. | 405/255 |
| 6,872,883 B2 | * | 3/2005 | Ginsburg | 174/45 R |
| 7,219,873 B2 | * | 5/2007 | Harwood | 248/519 |
| 2003/0233806 A1 | * | 12/2003 | Kuebler et al. | 52/726.4 |

* cited by examiner

*Primary Examiner*—Richard E Chilcot, Jr.
*Assistant Examiner*—William V Gilbert
(74) *Attorney, Agent, or Firm*—Ogilvy Renault LLP

(57) ABSTRACT

A service line distribution base (10) comprises a ground anchor (18) having an upstanding cruciform portion adapted to extend into the ground. A cabinet (20) suited to support a utility pole (14) extends upwardly from the ground anchor (18). The cabinet (20) defines and internal space for receiving buried wire conduits (28) incorporated to the cruciform ground anchor (18). The cruciform shape of the ground anchor (18) advantageously permits to incorporate a greater number of wire conduits (28) into the base of a utility pole as compared to conventional concrete bases.

15 Claims, 6 Drawing Sheets

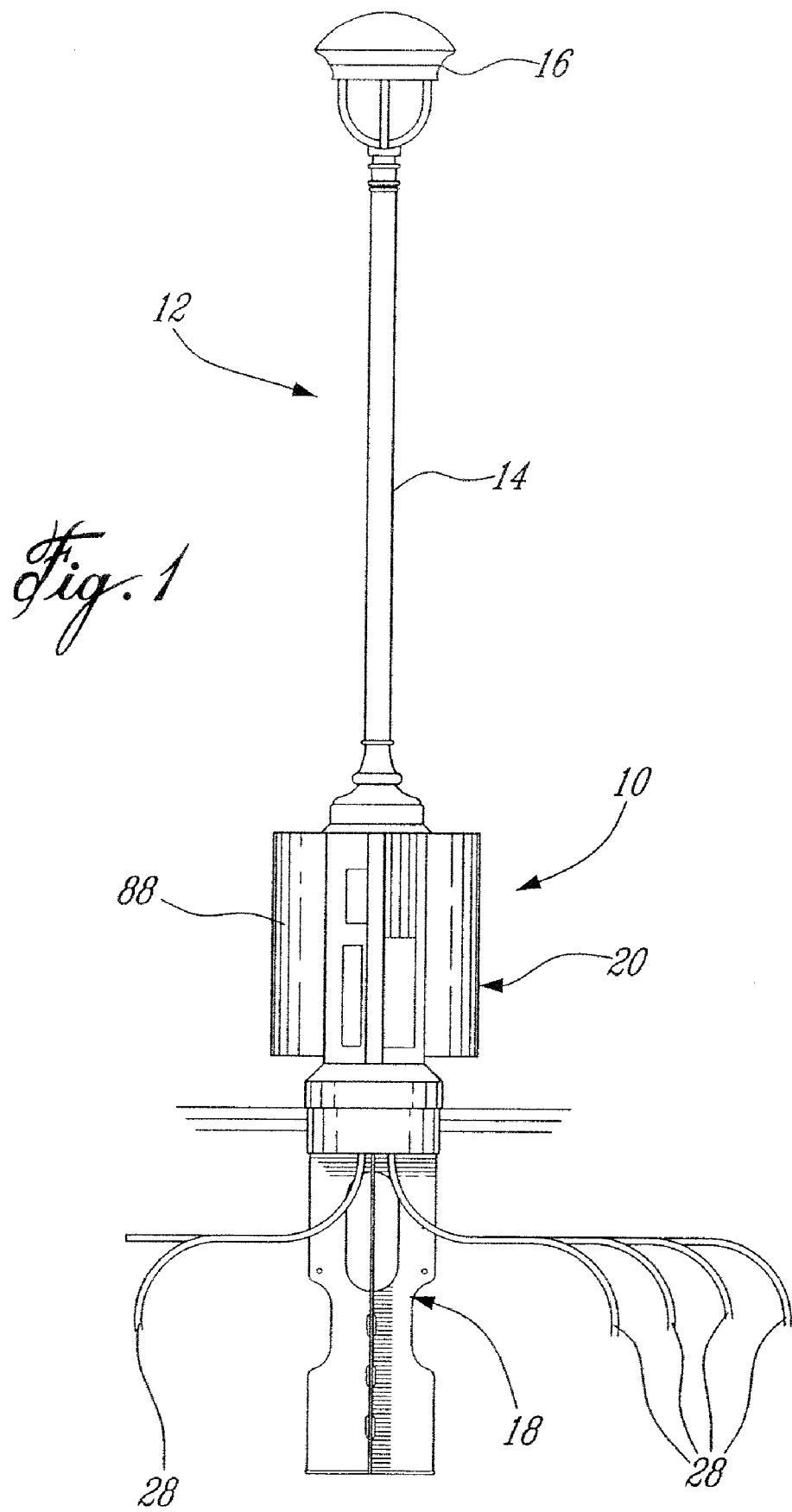

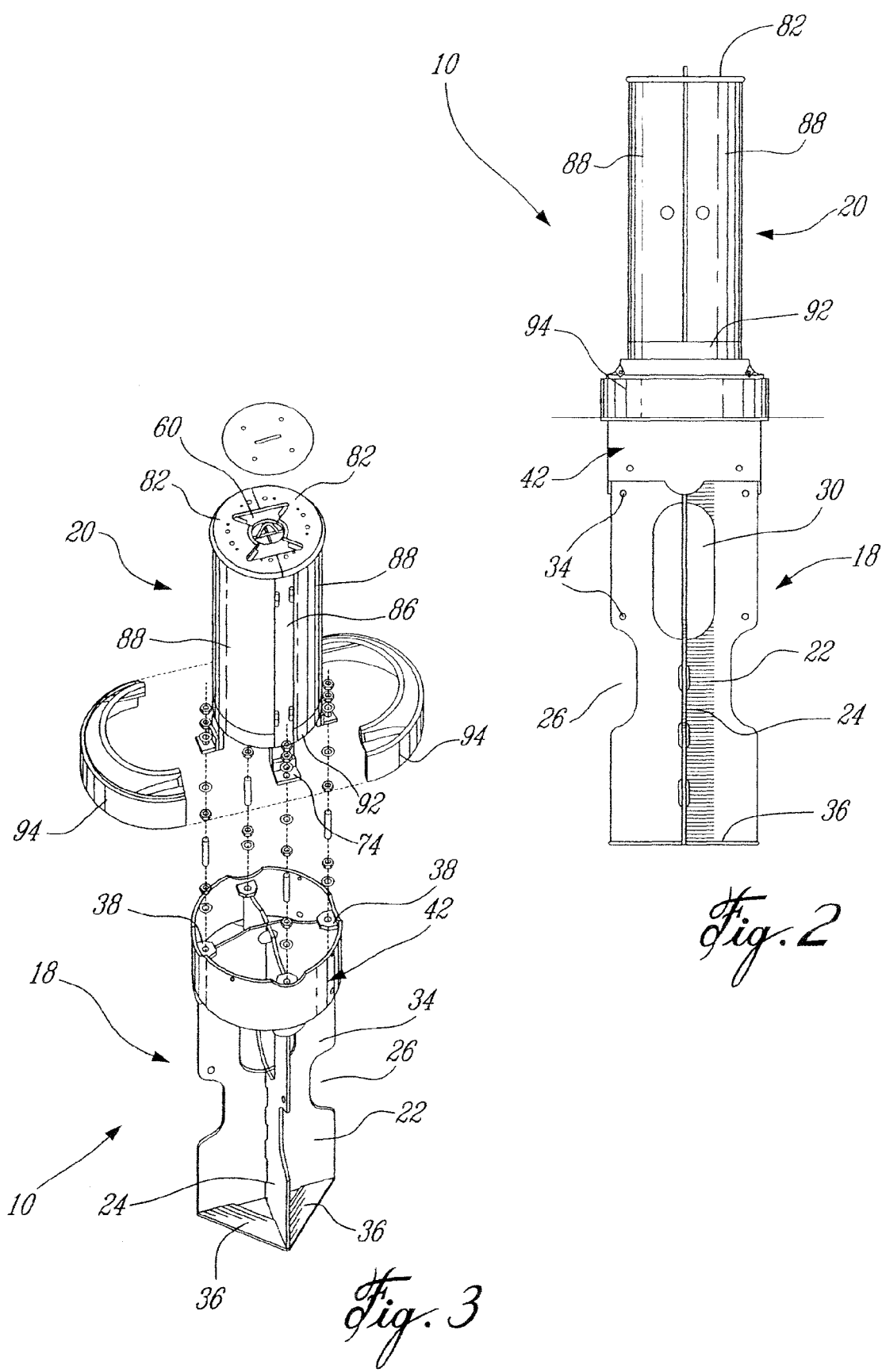

SERVICE LINE DISTRIBUTION BASE

RELATED APPLICATIONS

This is a continuation of U.S. patent application Ser. No. 11/431,833 filed on May 11, 2006 now U.S. Pat. No. 7,765,770, which is a continuation of International Patent Application No. PCT/CA2004/001586 filed Aug. 31, 2004, which claims benefit of Canadian Patent Application No. 2,449,194 filed on Nov. 12, 2003.

BACKGROUND OF THE INVENTION

1. Field of the Invention

The present invention generally relates to a service line distribution base suited for supporting utility poles of the type used to support overhead lines in power transmission and in external lighting, such as street, highway and traffic lighting.

2. Description of the Prior Art

Utility poles, such as traffic lights, street lights and those used to support power transmission lines are typically mounted on a concrete base or foundation partly buried in the soil. Threaded rods extend vertically upwardly from the exposed top surface of the concrete base for engagement in corresponding holes or slots defined in a mounting flange provided at the bottom end of the utility pole. Nuts are threadably engaged on the threaded rods for securing the pole on the concrete base.

A wire conduit is typically embedded in the concrete base for allowing buried wires to be connected to above-ground equipment, such as lighting fixtures mounted at the top of the utility pole. The number of wire conduits that can be embedded in the concrete base is significantly limited by the structural weakening of the concrete base each time a new conduit is added. Heretofore, the number of wire conduits extending upwardly through a concrete base of a utility pole has been generally limited to four conduits at most. It would be possible to incorporate more wire conduits in the concrete base by increasing the size thereof but this solution is not suitable in that it would result in oversized mass of concrete about the base of each pole. In addition of being unaesthetic, it would significantly increase the cost associated with the installation of the poles.

With the ever increasing complexity of the power transmission and telecommunication network, there is a need for a new service line distribution base that could accommodate a greater number of wire conduits in a confine space while still offering proper support for utility poles and the like.

SUMMARY OF THE INVENTION

It is therefore an aim of the present invention to provide a new base adapted to accommodate a greater number of wire conduits while still providing proper support for anchoring a utility pole in the ground.

It is also an aim of the present invention to provide an underground base comprising a ground anchoring member having an upstanding cruciform portion.

Therefore, in accordance with a general aspect of the present invention, there is provided a utility pole base comprising a ground anchor having an upstanding cruciform portion adapted to extend into the ground, an above-ground portion defining an internal chamber adapted to house electric wires, said above-ground portion being adapted to support a utility pole.

In accordance with a further general aspect of the present invention, there is provided a utility pole comprising an underground anchor, said underground anchor having an upstaging portion of cruciform cross-section, a cabinet extending axially from said underground anchor and defining an internal chamber for housing distribution equipment, said internal chamber having a bottom opening for receiving wires projecting upwardly from the underground anchor, and a pole segment extending axially upwardly from said cabinet.

In accordance with a still further general aspect of the present invention, there is provided an underground base for supporting a service line receiving member, comprising an anchor member having an upstanding portion of cruciform cross-section adapted to be buried into the ground, said anchor member having a top end portion adapted to project out of the ground, said top end portion being provided with mounting points for allowing a service line receiving member to be mounted on top of said anchor member, said mounting points being distributed on an imaginary perimeter bounding an axially open space for allowing buried wire conduits to extend into the service line receiving member once mounted onto the anchor member.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a side elevation view of a utility pole mounted to a service line distribution base in accordance with a preferred embodiment of the present invention; and FIG. 2 is a side elevation view of the service line distribution base;

FIG. 3 is a partly exploded isometric view of the service line distribution base;

DESCRIPTION OF THE PREFERRED EMBODIMENTS

Figure 5:
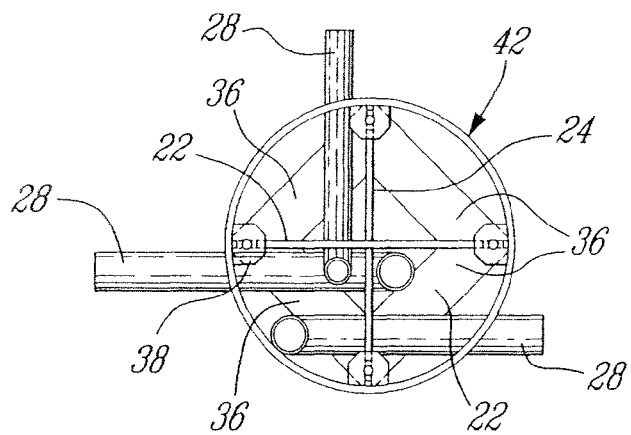
FIG. 5 is a top plan view of the anchoring portion installed in the ground.

FIG. 1 shows one possible utilization of a preferred embodiment of a service line distribution base 10 anchored in the ground for supporting a utility pole 12. In the illustrated example, the utility pole 12 is provided in the form of a lamp post including a hollow pole member 14 having a lighting fixture 16 attached at an upper end thereof. It is understood that other type of structures or equipment could be mounted on the service line distribution base 10. For instance, a medium voltage network pole, a traffic light, a bollard fixture or even a decorative cap.

As will be seen hereafter, the service line distribution base 10 advantageously provides for partial or complete burial of service lines 28, including power transmission lines and telecommunication lines, such as telephone lines and cable television lines. The base 10 also advantageously provides for the integration of a distribution system at the bottom of a utility pole, which distribution system can be used by power and telecommunication utilities to connect subscribers to the utility lines concealed in the pole and in the ground.

As shown in FIGS. 2 and 3, the base 10 generally comprises a ground anchoring member 18 and a distribution cabinet 20. The anchoring member 18 is buried in the ground and the distribution cabinet 20 is bolted on top on the anchoring member 18 at ground level. Alternatively, the cabinet 20 could be an integral extension of the anchoring member 18.

Figure 4:
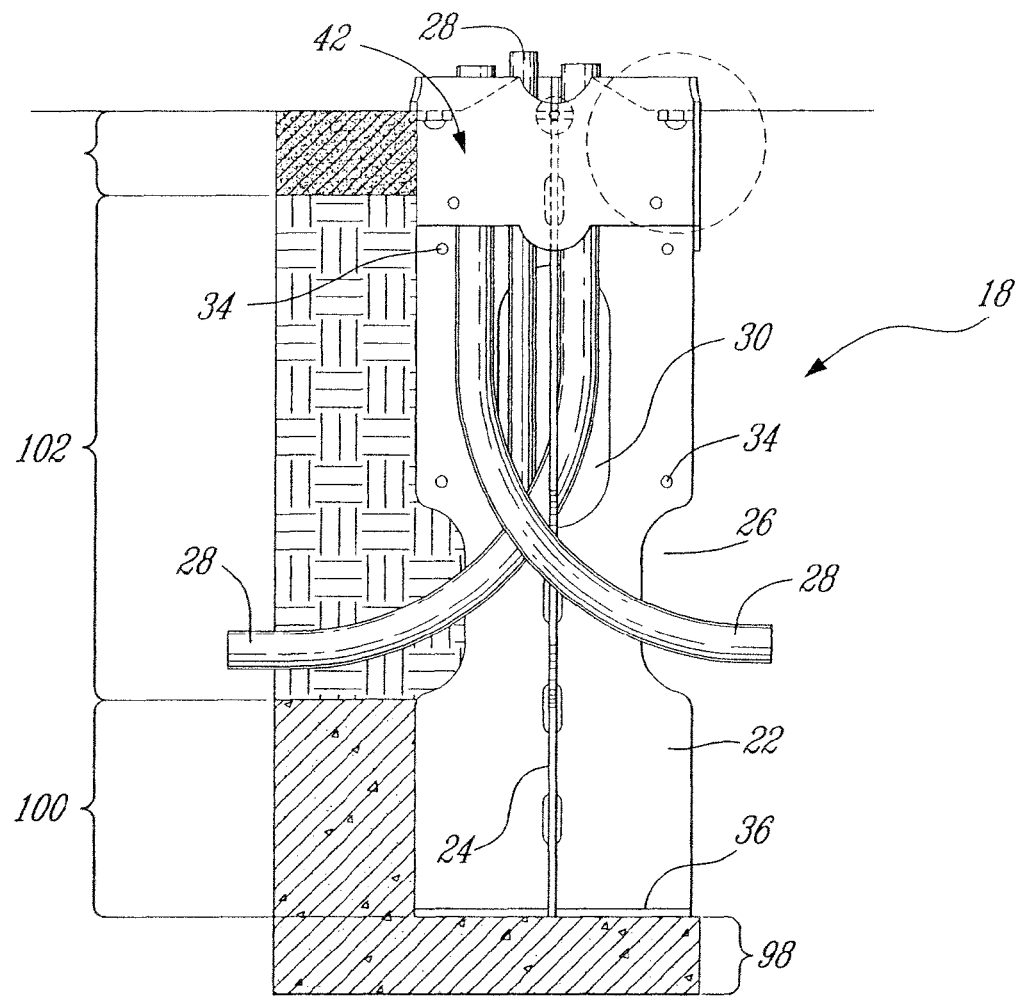
FIG. 4 is a side elevation view of a ground anchoring portion of the service line distribution base shown in FIG. 3 once installed in the ground with the wire conduits extending upwardly through the anchoring portion.
Figure 6:
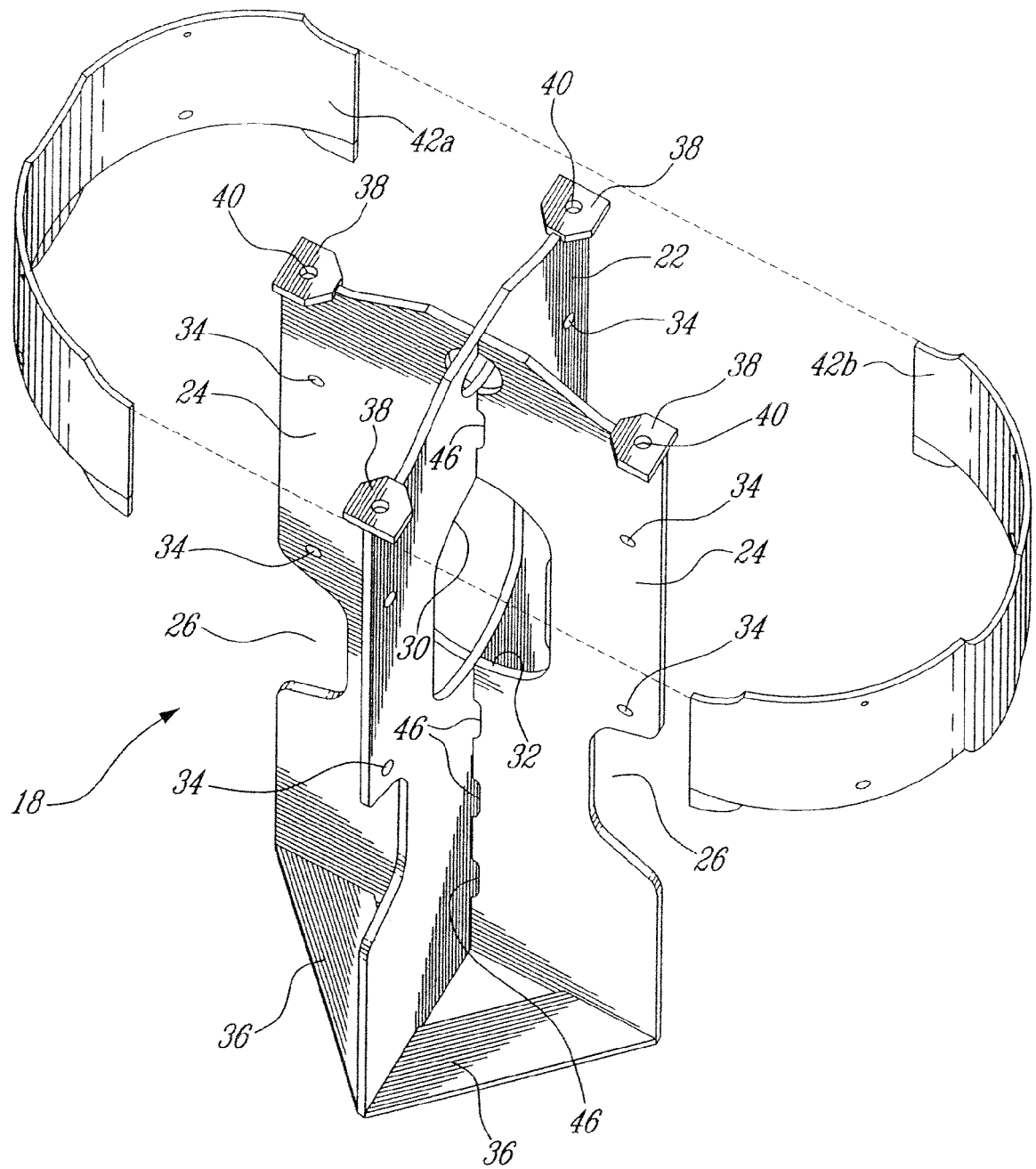
FIG. 6 is a partially exploded perspective view of the ground anchoring portion of the service distribution base.

As shown in FIG. 6, the ground anchoring member 18 is cruciform and includes a main metal plate 22 on opposed sides of which are symmetrically arranged a pair of identical metal plates 24. The metal plates 24 are welded to opposed sides of the main plate 22 and extend in a same central normal plane relative to the main plate 22. Each plate 24 corresponds to a half-plate section of the main plate 22. Notches or cutouts 26 are defined in the distal side edges of the plates 22 and 24. The cutouts 26 provides for easy placement of the wire conduits 28, as shown in FIGS. 4 and 5. The cutouts 26 also greatly contribute to increase the number of wire conduits that can be incorporated into the base 10 by allowing the same to have a smaller angle of insertion. A central oblong slot 30 is also defined in the main plate 22 for allowing wire conduits 28 to pass from one side of the cruciform anchoring member 18 to the other, as shown in FIGS. 4 and 5. Likewise, half-slot sections are defined in the confronting side edges of the plates 24 to form a second central oblong slots 32 (FIG. 6) intersecting the first oblong slot 30 centrally in a plane perpendicular to the main plate 22. Holes 34 are defined in the upper half portion of the plates for allowing the wire conduits to be attached to the ground anchoring member with attachment straps (not shown), such as wires, cables, filaments and the like.

As shown in FIG. 6, a flat horizontal strengthening member 36 preferably extends diagonally between the bottom ends of each pair of adjacent segment of the cruciform anchoring member 18.

Mounting plates 38 are welded on the top end edges of each plate 22, 24 at respective terminal distal ends thereof. Each plate 38 defines a central hole 40 for allowing the cabinet 20 to be secured in position on top of the anchoring member 18 by means of bolts and nuts, as shown in FIG. 3.

A collar 42 is provided at the top end of the cruciform anchor 18 about the plates 22 and 24. The collar 42 provides additional strength at the top end of the anchoring member 18 where the external forces exerted on the anchoring member 18 are the more important. Also, it confines the space through which the wire conduits project upwardly out of the ground. The collar 42 is preferably provided in the form of two half segments 42a and 42b welded to the distal side edges of the plates 22 and 24.

As shown in FIG. 6, small notches 46 are defined along the proximal longitudinal side edges of the plates 24 in order to reduce the amount of welding that need to be made. Welding full height without notches is also contemplated.

Longitudinally extending flat plates (not shown) could be welded centrally all along the distal longitudinal side edges of the plates 22 and 24 to further increase the strength of the anchoring member 18. Each wall segment of the cruciform anchoring member 18 would then have a T-shape.

Now referring to FIGS. 7 and 8, the construction of the cabinet 20 will be described. As shown in FIG. 8, the core of the cabinet 20 comprises a central metal plate 48 having opposed central longitudinally extending top and bottom slits 50 and 52. Top and bottom cross plates 54 and 56 (FIG. 7) are respectively mounted in the top and bottom slits 50 and 52. A hook or handle 58 is provided on the top edge of the top cross plate 54 for allowing the cabinet 20 to be lift once assembled. A generally circular top cover 60 is welded on top of the central plate 48 and the top cross plate 54. The cover 60 defines a central circular hole 62 through which the handle 58 extends. The central hole 62 provides for electric wiring in the utility pole 12 (FIG. 1) to extend into cabinet 20. Four indentations 64 are uniformly distributed in the circumference of the cover 60 for receiving the top end of four corresponding longitudinally extending legs 66, 68, 70 and 72. The legs 66, 68, 70 and 72 are substantially coextensive with the central plate 48. Legs 66 and 68 are welded to oppose longitudinal side edges of the central plate 48 and in respective indentation in the cover 60. Legs 70 and 72 are welded to the end edges of the top and bottom cross plates 54 and 56 and in respective indentations 64 in the cover 60. Each leg 66, 68, 70 and 72 has a horizontally extending foot portion 74 defining a hole 76 for allowing the cabinet 20 to be bolted to the mounting plates 38 of the anchoring member 18 (see FIG. 3).

Indentations 78 are preferably defined in the side edges of the central plate 48 to minimize the amount of welding that has to be done to secure the legs 66 and 68 to the plate 48.

The opposed faces of the mounting plate 48 are used to mount distribution equipment, such as power bars, electrical connections, junction boxes, etc.

According to a further embodiment of the cabinet, the central plate 48 can be omitted. Only form reinforced legs would be used.

Radial slots 80 are defined in the cover 60 to provide for the bolting of various structures on top of the cabinet 20.

Figure 7:
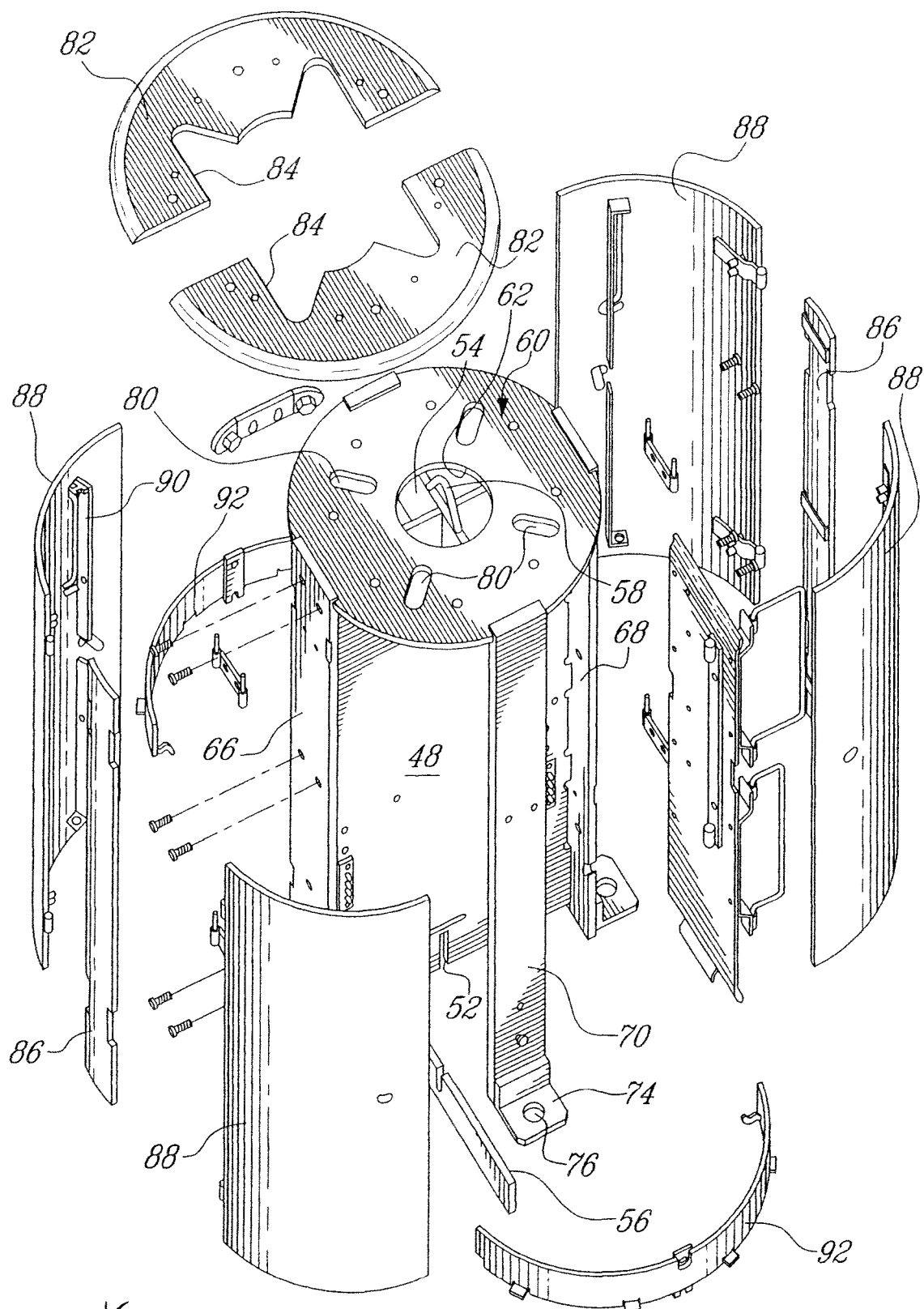
FIG. 7 is a partially exploded perspective view of a distribution cabinet forming part of the service line distribution base.
Figure 8:
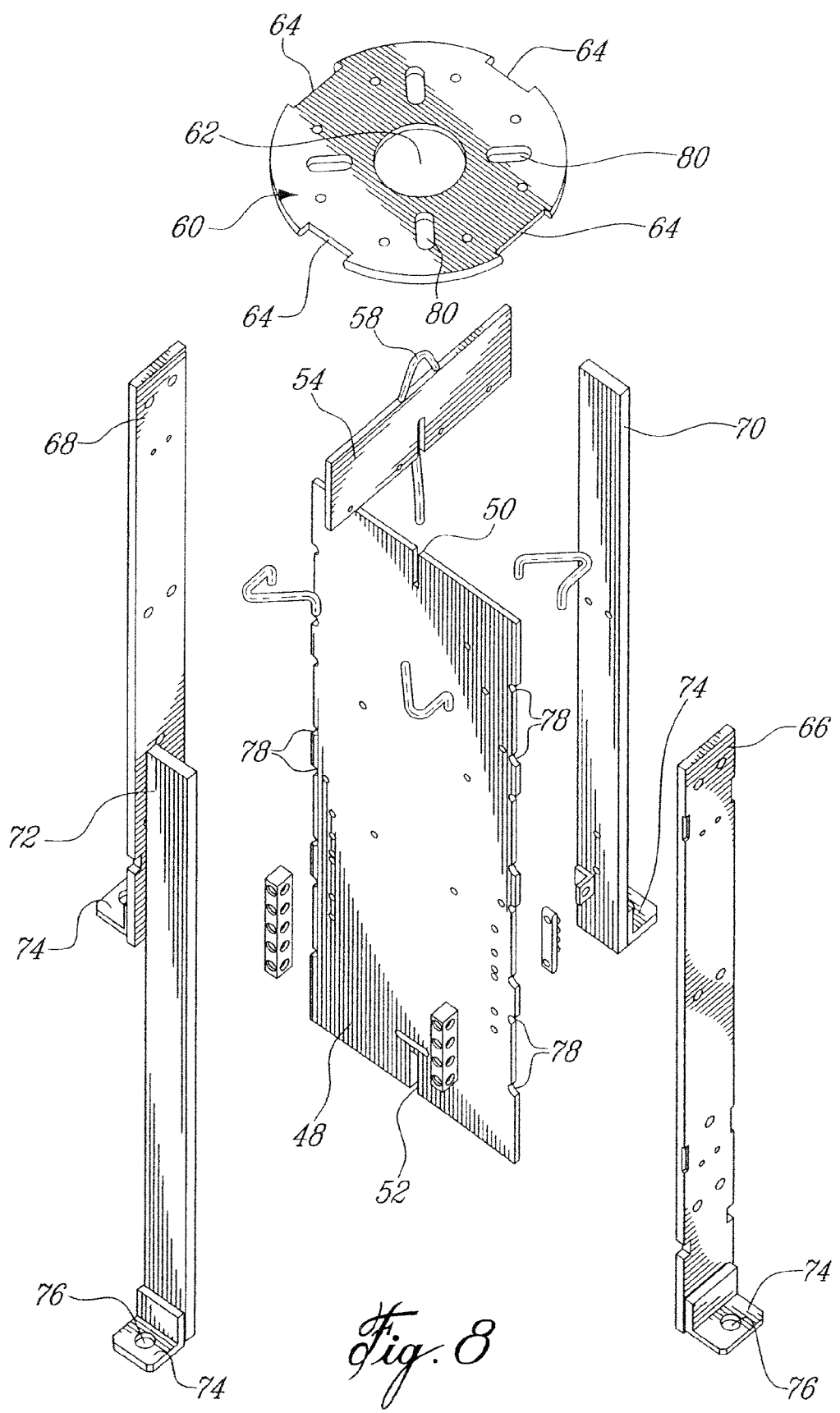
FIG. 8 is an exploded perspective view of the core components of the distribution cabinet shown in FIG. 7.

As shown in FIGS. 3 and 7, two half-cover shields 82 are securely mounted on top of the cover 60. Cutouts 84 are provided in the half-cover shields 82 to provide access to the central hole 62 and the radial slots 80. Leg covering members 86 are provided for covering the legs 66 and 68. Four access doors 88 are hingedly mounted between the legs 66, 68, 70 and 72. Each door 88 is provided with its respective locking mechanism 90 so that only authorized person can have access to the interior of the cabinet 20. Semi circular bandings 92 are mounted to the bottom of portion of the legs 66, 68, 70 and 80 below the doors 88 in order to completely close the cabinet 20.

As shown in FIG. 3, the assembly of the cabinet 20 is completed by installing semi-circular bumpers 94 at the base of the cabinet 20 once the same has been bolted to the anchoring member 18.

As shown in FIG. 4, the service line distribution base 10 is installed by first lowering the anchor member 18 in an excavated hole of about 1.8 m (6 ft) deep and 1.8 m (6 ft) in diameter with a compacted aggregate bottom 98 (90% MP) to 1.68 m (66 in.) below the predicted finished grade level. The top of the anchoring member 18 exceeds the finished grade predicted level by about 65 mm (2.5 in.). The next step consists of backfilling the hole using successive layers of compacted aggregate 100 from bottom, up to the beginning of the notches 26 at 500 mm (18 in.). It is recommended to verify that the anchoring member 18 is plumb (straight) while compacting. It is also recommended to backfill with well distributed aggregates of crushed stones 0-20 mm (0-¾ in.) compacted at 90%. A grounding rod (not shown) with a grounding cable (not shown) is then installed. Thereafter, the wire conduits 28 are installed for the various networks to be incorporated. The wire conduits 28 are preferably attached to the anchor member 18 with attachment straps (not shown) extending through the holes 34 in the anchor member 18. Thereafter, the excavated hole is full with flowable concrete 102 up to between 125 to 150 mm (5 to 6 in.) below the finished grade. If the quantity of wire conduits exceeds 12, it is recommended to reduce the size of aggregate in concrete to from 20 mm (¾ in.) to 12 mm (½ in.) to ensure a good penetration of the flowable concrete in the middle of the structure. Once the flowable concrete has solidified, finish landscaping to grade level. The distribution cabinet 20 is then bolted on top of the ground anchoring member 18. Finally, the utility pole 12 is bolted on top of the cabinet 20. The resulting structure is then ready for cabling and installation of distribution equipment by utilities.

What is claimed is:

1. A modular utility pole comprising a pole segment removably mounted on top of a separate service line distribution cabinet, the distribution cabinet being located at a bottom portion of the pole near ground level and supporting the pole segment mounted thereon, the cabinet comprising an envelope defining an internal chamber housing distribution equipment, the envelope comprising a plurality of doors mounted to an internal support structure of the cabinet for providing access to the distribution equipment, said internal chamber having a bottom end defining an opening for receiving wire conduits buried in the ground, the internal support structure of the cabinet comprising an upstanding central plate dividing the internal chamber in first and second sections from bottom to top, first and second upstanding legs centrally disposed between opposed longitudinal side edges of the central plate and on opposed lateral faces thereof at a periphery of the first and second sections, the first and second upstanding legs being disposed on an axis generally perpendicular to the central plate so as to define with the central plate a cruciform support structure, a top cover supported by said cruciform structure, the axis of the first and second upstanding legs intersecting the central plate generally at a center of the top cover, the pole segment being bolted to the top cover and supported by the cruciform structure formed by the central plate and the first and second upstanding legs, thereby relieving the envelope of the distribution cabinet from the load of the pole segment.

2. The modular utility pole defined in claim 1, wherein a central hole is defined in the top cover for allowing the passage of wiring into the pole segment.

3. The modular utility pole defined in claim 2, wherein slotted holes are defined in the top cover about the central hole for allowing bolting of the pole segment to the top cover.

4. The modular utility pole defined in claim 1, wherein said first and second upstanding legs are received in recesses defined in the periphery of the top cover.

5. The modular utility pole defined in claim 1, wherein a cross-plate is centrally mounted to a top end of the upstanding central plate, the top cover being welded to both the cross-plate and the upstanding central plate.

6. The modular utility pole defined in claim 2, wherein a hook extends upwardly through said central hole.

7. The modular utility pole defined in claim 1, wherein third and fourth upstanding legs are provided on opposite side edges of the central plate, the third and fourth legs being connected at upper ends thereof to the top cover.

8. The modular utility pole defined in claim 1, wherein the first, second, third and fourth legs are each provided with a horizontal foot portion, the foot portion defining a hole for receiving a bolt in order to anchor the cabinet to a foundation extending from the ground.

9. A modular utility pole comprising a hollow pole member removably mounted on a distribution cabinet located at the bottom end of the pole near ground level, the cabinet defining an internal chamber circumscribed by an envelope comprising a plurality of doors distributed around the periphery of the cabinet for providing access to distribution equipment housed inside the cabinet, the envelope of the cabinet being mounted to a structural core, the structural core comprising a top plate defining a central hole for allowing the passage of wires between the internal chamber of the cabinet and the hollow pole member, the hollow pole member resting on the top plate and being detachably mounted thereto, the structural core of the cabinet further comprising an upstanding metal plate mounted centrally underneath the top plate and extending across the internal chamber, thereby dividing the internal chamber in two compartments, and a first pair of legs substantially coextensive to the upstanding metal plate and disposed at the periphery of a respective one of said two compartments, the legs extending downwardly from the top cover and cooperating with the upstanding metal plate to support the weight of the hollow pole member, thereby leaving the envelope of the distribution base substantially unloaded.

10. The modular utility pole defined in claim 9, wherein a second pair of legs are mounted along the opposed side edges of the upstanding metal plate, each leg of the first and second pairs of legs having a foot at a bottom end thereof, the foot defining a hole for receiving a bolt, thereby providing for the bolting of the distribution cabinet to a pole foundation extending into the ground.

11. The modular utility pole defined in claim 9, wherein a top cross-plate is mounted to the upstanding metal plate, the top cross-plate extending perpendicularly to the upstanding metal plate directly underneath the top plate, the top plate being welded to both the upstanding plate and the top cross-plate.

12. The modular utility pole defined in claim 9, wherein the upstanding metal plate has opposed central vertically extending top and bottom slits respectively defined in the top and bottom edges thereof, and wherein top and bottom cross-plates are respectively mounted in the top and bottom slits.

13. The modular utility pole defined in claim 11, wherein a hook is provided on the top edge of the top cross-plate, the hook extending through the central hole defined in the top plate for allowing the cabinet to be lift by the hook.

14. The modular utility pole defined in claim 9, wherein recesses are defined around the periphery of the top plate to accommodate the first and second pair of legs.

15. The modular utility pole defined in claim 9, wherein semi-circular bandings are mounted to a bottom portion of the legs below the doors of the cabinet.

* * * * *